Feb. 11, 1930.  J. L. RUSHTON  1,746,871
GEARING FOR CONVEYING ROTARY MOTION
Filed Sept. 15, 1926  4 Sheets-Sheet 1
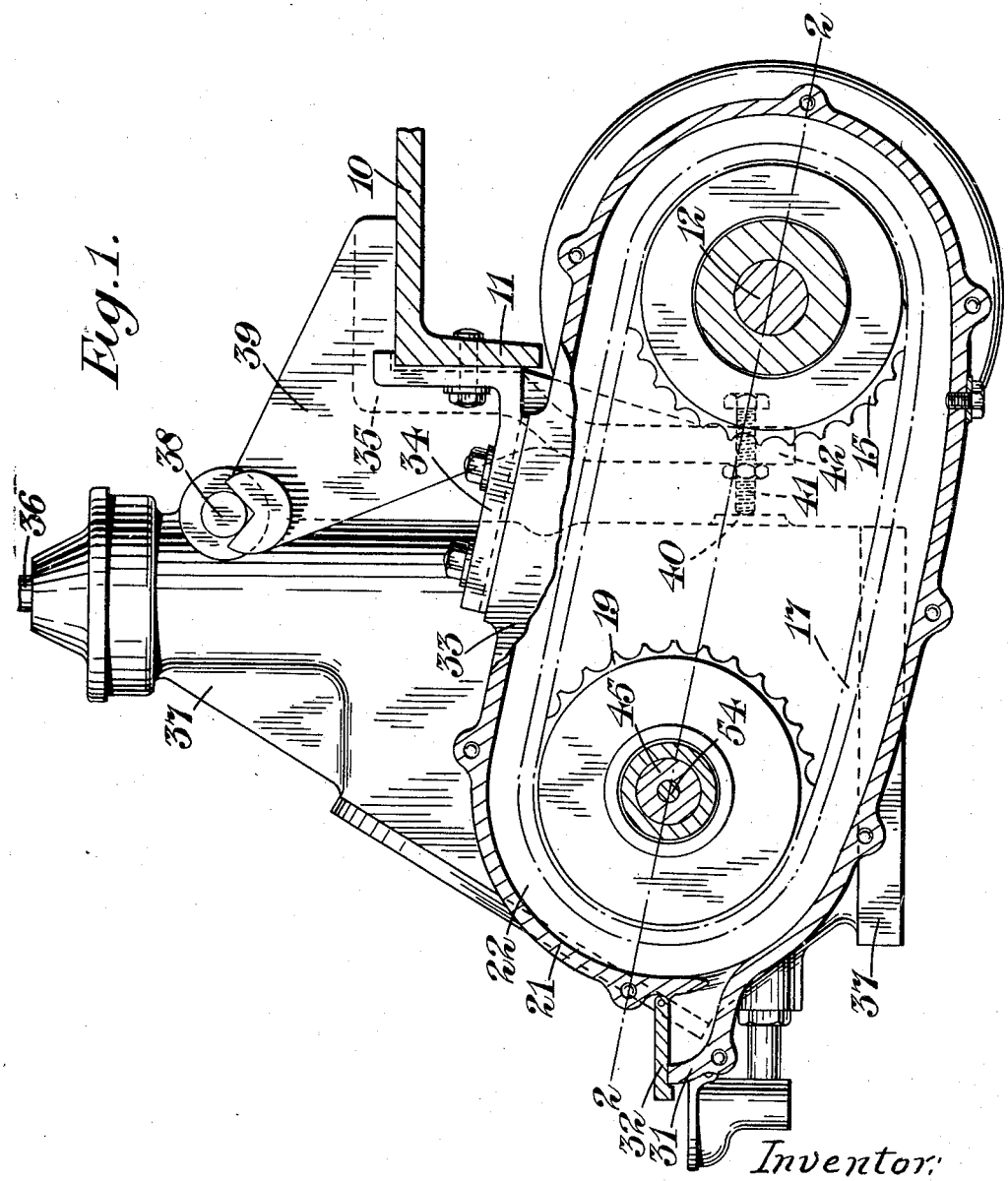

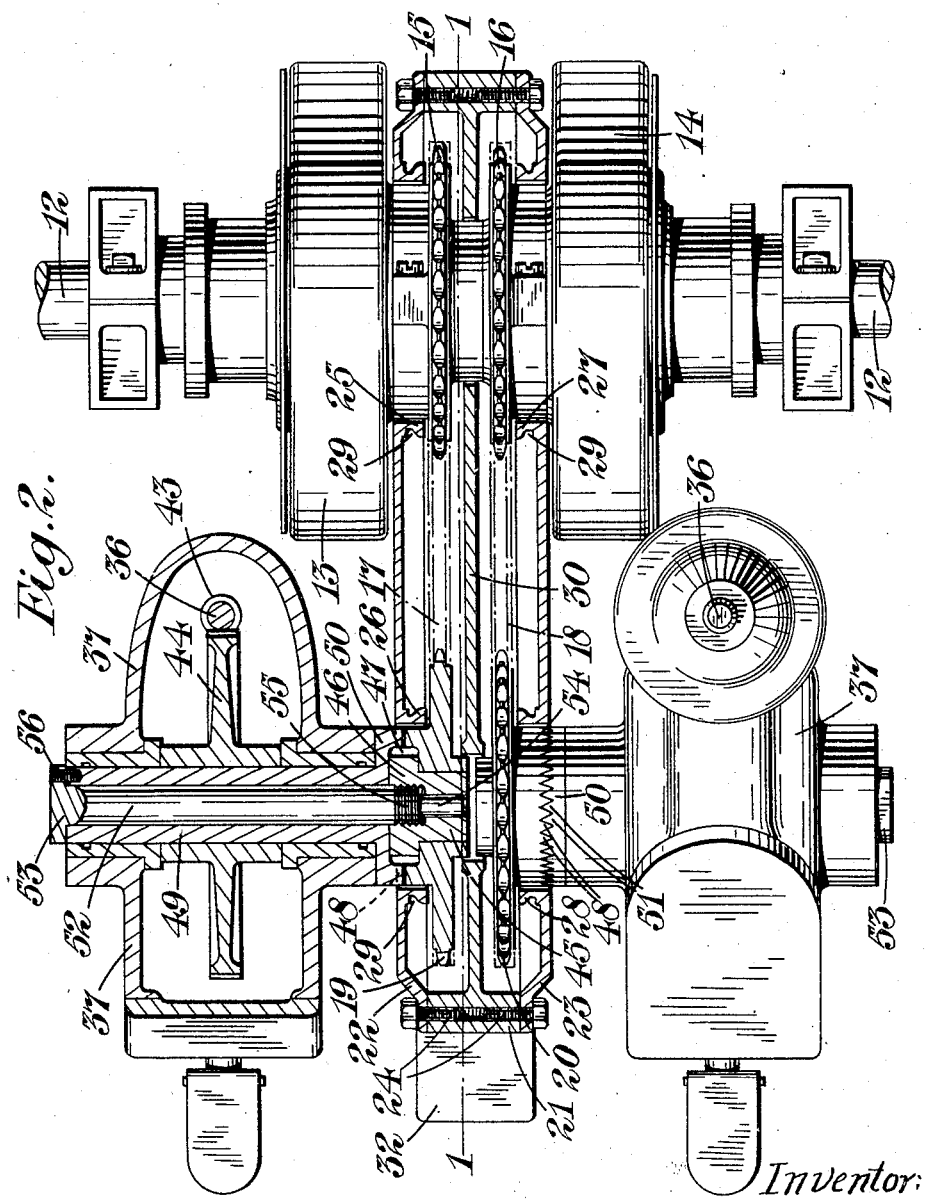

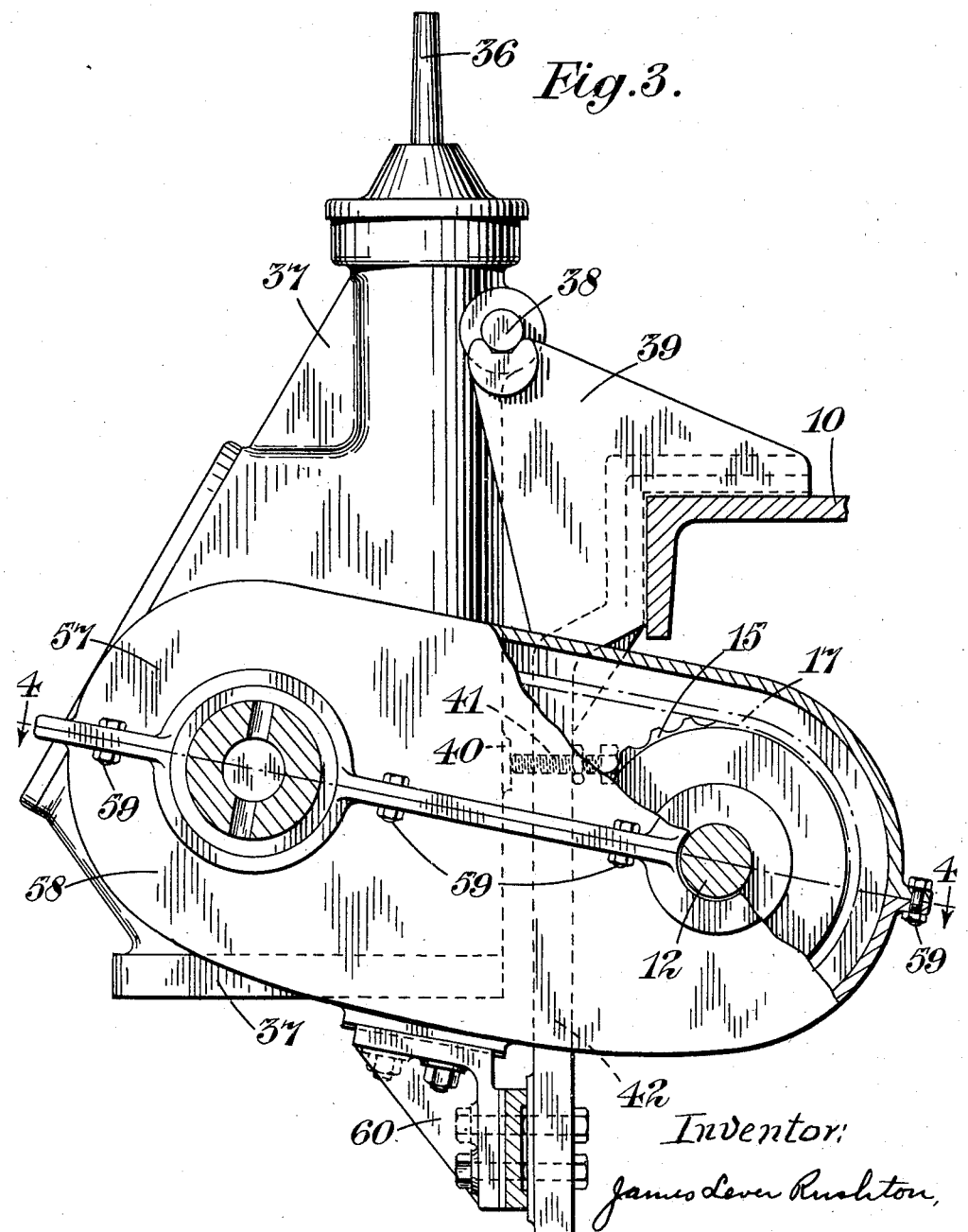

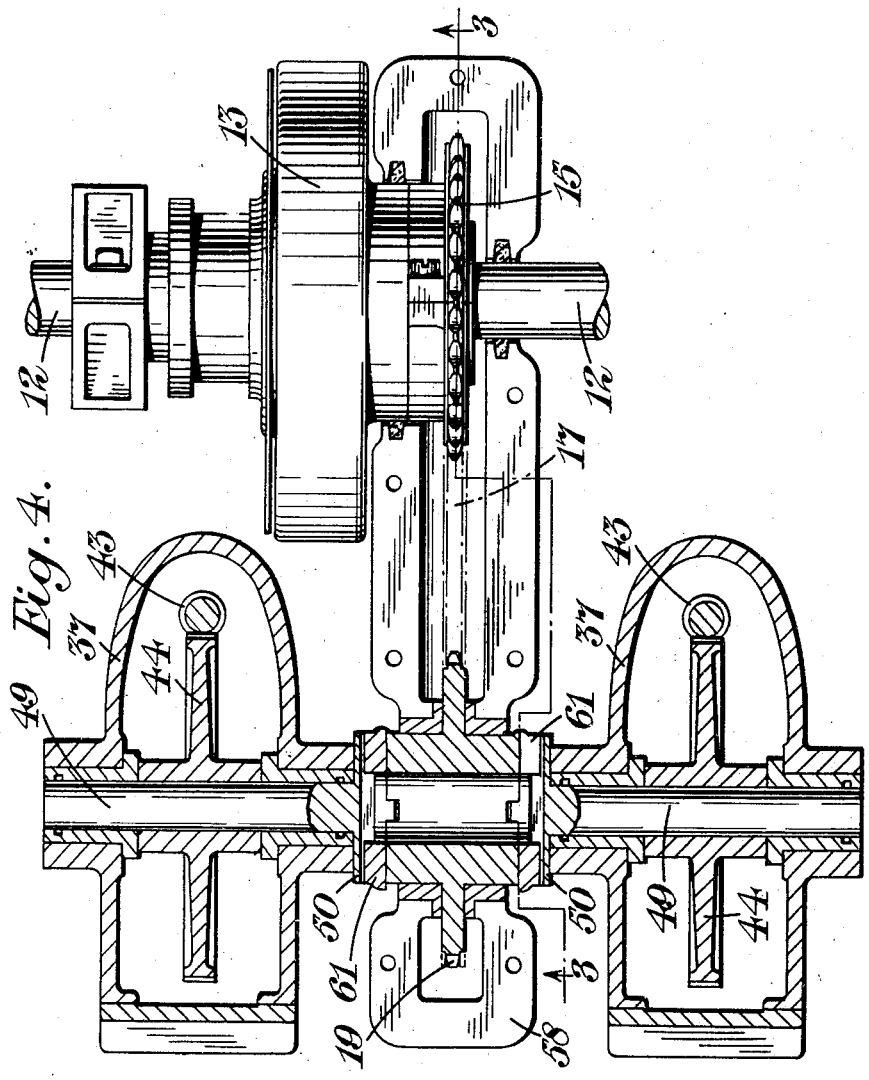

Patented Feb. 11, 1930

1,746,871

UNITED STATES PATENT OFFICE

JAMES LEVER RUSHTON, OF BOLTON, ENGLAND

GEARING FOR CONVEYING ROTARY MOTION

Application filed September 15, 1926, Serial No. 135,644, and in Great Britain September 24, 1925.

This invention is for improvements in or relating to gearing for conveying rotary motion, and has for one of its objects to provide a construction which shall be convenient to use particularly in machines having a number of "heads" driven from a single main shaft and in which stoppage of one or other of said heads is necessary fairly frequently.

According to the primary feature of the present invention there is provided a transmission train of gearing comprising in combination a primary transmission member (for example a sprocket wheel), a clutch interposed between said primary transmission member and a main driving shaft to transmit motion when desired, from the latter to the former, a secondary transmission member (for example another sprocket wheel) operatively coupled (for example by a chain) to the primary transmission member to be driven thereby, one or more driven members (for example spur wheels operating centrifugal spinning boxes for manufacturing artificial silk), a readily-disconnectible coupling interposed between said secondary transmission member and each of said driven members, and means for supporting said coupled elements in such a manner as to permit the uncoupling and detachment of any of the said driven members from the secondary transmission member without necessarily disturbing the connection between the primary and secondary transmission members.

It is preferred to arranged for the said primary and secondary transmission members, and the operative connection between them, to be carried in a casing (for example constituting an oil bath) which is independently supported as a single unit, and also to arrange for the said driven member or members to be individually carried each in another casing (for example also constituting an oil bath) which is also independently supported as a single unit. A single casing as aforesaid containing one or two sets of primary and secondary transmission members and their operative connections may be arranged between, and closely adjacent to, two casings each containing one of the said driven members, with the aforesaid readily-disconnectible couplings situated in, or substantially in, the planes of the adjacent faces of said casings. Where the casing is employed as an oil bath it may be provided with inwardly directed perforated bosses serving as bearings for the gearing spindles and each boss having an annular groove on its periphery adjacent to the wall of the casing and serving to prevent leakage, as will be hereinafter described.

The said readily-disconnectible coupling preferably comprises a set of teeth rigid (so far as rotation is concerned) with the said secondary transmission member, other teeth rigid (so far as rotation is concerned) with the said driven member and arranged to mesh with the first-mentioned set of teeth, and detachable means for drawing the said sets of teeth towards each other and maintaining them in operative engagement. In one construction the said sets of teeth are drawn together by a rod lying along the axis of the secondary transmission member and of the driven member and formed at one end with a shoulder to abut against one of said last-named parts (the secondary transmission member and driven member) and adjustably attached at its other end (for example by screwing) to the other of said parts, and there may be provided a distance piece to limit the closeness with which the sets of teeth can be drawn together. In another construction the said readily-disconnectible coupling is of the "Oldham" type.

It is a feature of the invention to employ a transmission train, as specified above, at each of a plurality of positions along the main driving shaft, one or more driven members being driven at each of said positions through the said transmission train, and it will be appreciated that by the employment of the present invention any of the said driven members may be stopped, removed or dispensed with entirely without interfering with the drive to the remaining driven members.

For a more complete understanding of the invention there will now be described, by way of example only and with reference to the accompanying drawings, certain arrangements of gearing according to the invention. It is to be understood, however, that the invention is not restricted to the precise constructional details set forth.

In these drawings:—

Figure 1 is an end elevation, partly in section on the line 1—1 of Figure 2, of a train of gearing particularly adapted for driving the spindle boxes of artificial silk spinning machines.

Figure 2 is a plan view, partly in section on the line 2—2 of Figure 1.

Figure 3 is an end elevation corresponding to Figure 1, but showing a modified arrangement of gearing, also suitable for driving the spinning boxes of artificial silk spinning machines. Figure 3 is partly in section on the line 3—3 of Figure 4, and Figure 4 is a plan view, partly in section on the line 4—4 of Figure 3.

Like reference numerals indicate like parts throughout the drawings.

Referring firstly to Figures 1 and 2, there is shown at 10 a portion of the framework of the machine in the form of an angular bar, the length of which will depend upon the number of heads, such as spinning boxes, to be comprised in the machine. The bar 10 will usually be of channel formation having two flanges, one of which is shown at 11, and serving thus to support spinning boxes along both its sides. A main shaft of the machine is shown at 12. If the machine is double-sided, as just mentioned, there will usually be two main shafts provided, but for the sake of clearness the present drawings only show a portion of one side of the machine. At suitable positions along its length, the shaft 12 is provided with clutches of which two are shown at 13 and 14; one clutch is appropriated to each spinning box. Co-axial with, and driven by, each clutch is a sprocket wheel 15 and 16 respectively, each of these wheels constituting one of the aforesaid primary transmission members. The wheels 15 and 16 are coupled by chains 17 and 18 to other sprocket wheels 19 and 20 respectively, each of which constitutes one of the said secondary transmisison members.

The sprocket wheels and chains are received in the interior of a two-compartment casing comprising a middle portion 21 and two end plates 22 and 23 respectively. The end plates are held in position on the middle portion by studs 24, and they have inwardly projecting bosses 25 and 26, and 27 and 28 respectively. The bosses are perforated to serve as bearings for hubs on the sprocket wheels and are each formed in their outer surfaces with an annular groove 29. The middle portion 21 of the casing is formed with a central rib 30 which divides the casing into two compartments and is perforated to form bearings for hubs on the four sprocket wheels. Each compartment of the casing constitutes an oil bath, and oil can be fed thereto through an intake spout 31 having a movable cover 32. The grooves 29 serve to collect oil thrown against the end walls of the casing and to prevent such oil leaking through the perforations in the bosses. The middle portion 21 of the casing is formed on its upper surface with a boss 33 which abuts against the under face of, and is secured to, a portion 34 of a bracket whereof another portion 35 is secured to the bar 10. In this way the casing is supported in position.

The spinning box spindle is indicated at 36, it being mounted in a casing 37 having lateral trunnions 38. These trunnions rest in a bracket 39 mounted upon the bar 10, and the face of the casing 37 which is directed towards the bar hangs substantially vertically and is formed with a boss 40. This boss is engaged by an adjusting stud 41 carried in a depending portion 42 of the bracket 39, and in this way the setting of the casing 37 relatively to the casing for the sprocket wheels can be adjusted. Inside the casing 37, the spindle 36 is formed with spiral teeth 43 which mesh with a gear wheel 44 constituting one of the aforesaid driven members. The casing 37 preferably constitutes an oil bath.

The sprocket wheels 19 and 20 are each internally bored to receive a sleeve 45, the sleeves being secured to their respective sprocket wheels. Each sleeve has a head 46 which abuts against the bottom face of a recess 47 in one side of the sprocket wheel hub, and the lateral face of the hub around this recess is formed with teeth 48. The head 46 of the sleeve 45 is thick enough to reach out beyond the faces of these teeth. Mounted inside the casing 37 is a hollow shaft 49 having on its end towards the sprocket wheel 19 or 20, as the case may be, a flange 50 with teeth 51 facing the teeth 48. The end face of the flange 50 is recessed and abuts against the outer end of the head 46 on the sleeve, thus determining the closeness with which the two sets of teeth 48 and 51 shall mesh. In the interior of each shaft 49 is a rod 52 whereof the head 53 bears against the outer end of the shaft. The other end of each rod 52 is reduced, as indicated at 54, and reaches into the interior of the sleeve 45. Adjacent to this reduced portion 54, the rod 52 is screw-threaded, as indicated at 55, to engage screw-threads in the interior of the sleeve. Thus, the rod 52 serves to draw the shaft 49 and sprocket wheel together, and the head 53 is provided with a screw 56 to prevent undesired rotation of the rod.

By employing the construction just described, it will be seen that any individual spinning box may have its drive discontinued without interfering with the drive to any of the other boxes. Indeed, not only can any individual spinning box be stopped at will, but it can be completely dismounted with considerable ease without stopping the working of any of the other boxes. When the rod 52 has been detached the corresponding casing 37 can be lifted out of position.

Referring now to the construction shown in Figures 3 and 4, the sprocket wheels 15 and 19, and their connecting chain 17, are housed in a casing consisting of two parts 57 and 58 which are secured together by bolts 59 passing through flanges on both parts of the casing. The casing thus only encloses one pair of sprocket wheels and a single chain, and it is mounted in position by a bracket 60 situated underneath the lower part 58 of the casing and carried by an extension of the bracket 42 which supports the spinning box casing. In this construction, the sprocket wheel 19 has enlarged hubs on both side faces which extend beyond the bearing in the casing 57, 58. The end faces of these hubs are recessed each with a single transverse slot, and the flanges 50 of the shafts 49 are formed each with a single transverse rib to co-operate with an "Oldham" coupling disc 61. Thus the sprocket wheel 19 drives two gear wheels 44, and the shafts 49 can be separately aligned with the sprocket wheel 19, the discs 61 accommodating slight variations in the alignment and also permitting the casings for the spinning box spindles to be readily dismounted. In this construction either of the driven members can be disconnected from the wheel 19 without permanently stopping the other one, though, of course, it will be preferable to stop it temporarily, by disengaging the clutch 13, while the actual operation of removing the driven member is performed.

It will be appreciated that the casings which enclose the various parts of the gearing serve not only to support these parts and to contain lubricant for them, when necessary, but also to protect the enclosed parts from the atmosphere, this being a particularly important requirement in artificial silk machinery. It is to be understood that the invention is not restricted to the precise constructional details set forth. For instance, although the invention is particularly applicable to driving the spinning boxes of artificial silk spinning machines, it is not limited to this particular use, and furthermore, although chain sprockets are the preferred form of the said primary and secondary transmission members it is to be understood that the invention is not restricted to a chain drive between these two parts.

I claim:—

1. A transmission train of gearing, comprising in combination a primary transmission member, a clutch interposed between said primary transmission member and a main driving shaft to transmit motion, when desired, from the latter to the former, a secondary transmission member, means for operatively coupling said secondary transmission member to the primary transmission member to be driven thereby, a casing for containing the primary and secondary transmission members and the operative connections between them, means for independently supporting said casing as a single unit, a driven member, another casing enclosing said driven member, an open-topped seating for independently supporting said last-named casing as a single unit, which seating leaves the casing free to be lifted therefrom, and a readily-disconnectible coupling interposed between said secondary transmission member and the said driven member, the coupled elements being supported by the said casings in such a manner as to permit the uncoupling and detachment of the driven member from the secondary transmission member without necessarily disturbing the connection between the primary and secondary transmission members.

2. A transmission train of gearing, comprising in combination a primary transmission member, a clutch interposed between said primary transmission member and a main driving shaft to transmit motion, when desired, from the latter to the former, a secondary transmission member, means for operatively coupling said secondary transmission member to the primary transmission member to be driven thereby, a casing for containing the primary and secondary transmission members and the operative connections between them, means for independently supporting said casing as a single unit, a plurality of driven members, a corresponding plurality of additional casings wherein the said driven members are individually carried one in each casing, an open-topped seating for independently supporting said last-named casings each as a single unit, which seating leaves the casing free to be lifted therefrom, and a readily-disconnectible coupling interposed between said secondary transmission member and each of said driven members, the coupled elements being supported by the said casings in such a manner as to permit the uncoupling and detachment of any of the said driven members from the secondary transmission member without necessarily disturbing the connection between the primary and secondary transmission members.

3. A transmission train of gearing, comprising in combination a primary transmission member, a clutch interposed between said primary transmission member and a main driving shaft to transmit motion, when desired, from the latter to the former, a secondary transmission member, means for operatively coupling said secondary transmission member to the primary transmission member to be driven thereby, a casing for containing the primary and secondary transmission members and the operative connections between them, means for independently supporting said casing as a single unit, a driven member, another casing enclosing said driven member, a stationary bracket affording an open-topped seating in which said casing is pivotally hung, which seating leaves the casing free to be lifted therefrom, means for adjusting the setting of said casing relatively to the bracket about the axis of the said pivot, and a readily-disconnectible coupling interposed between said secondary transmission member and the said driven member, the coupled elements being supported by the said casings in such a manner as to permit the uncoupling and detachment of the driven member from the secondary transmission member without necessarily disturbing the connection between the primary and secondary transmission members.

4. A transmission train of gearing, comprising in combination a primary transmission member, a clutch interposed between said primary transmission member and a main driving shaft to transmit motion, when desired, from the latter to the former, a secondary transmission member, means for operatively coupling said secondary transmission member to the primary transmission member to be driven thereby, a casing for containing the primary and secondary transmission members and the operative connections between them, means for independently supporting said casing as a single unit, two driven members, two additional casings wherein the said driven members are individually carried one in each casing, means for independently supporting said last-named casings each as a single unit and one on each side of the first-mentioned casing, and a readily-disconnectible coupling interposed between said secondary transmission member and each of said driven members, said couplings being situated in the planes of the adjacent faces of said casings and the coupled elements being supported by the said casings in such a manner as to permit the uncoupling and detachment of either of the said driven members from the secondary transmission member without necessarily disturbing the connection between the primary and secondary transmission members.

5. A transmission train of gearing, comprising in combination two primary transmission members, two clutches interposed one between each of said primary transmission members and a main driving shaft to transmit motion, when desired, from the latter to the former, two secondary transmission members, means for coupling said secondary transmission members one to each of the primary transmission members to be driven thereby, a single casing for containing the two sets of primary and secondary transmission members and the operative connections between them, means for independently supporting said casing as a single unit, two driven members, two additional casings wherein the said driven members are individually carried one in each casing, means for independently supporting said last-named casings each as a single unit and one on each side of the first-mentioned casing, and a readily-disconnectible coupling interposed between each secondary transmission member and its adjacent driven member, said couplings being situated in the planes of the adjacent faces of said casings and the coupled elements being supported by the said casings in such a manner as to permit the uncoupling and detachment of either of the said driven members from the secondary transmission member without necessarily disturbing the connection between the primary and secondary transmission members.

6. A transmission train of gearing, comprising in combination two primary transmission members, two clutches interposed one between each of said primary transmission members and a main driving shaft to transmit motion, when desired, from the latter to the former, two secondary transmission members, means for coupling said secondary transmission means one to each of the primary transmission members to be driven thereby, a single casing divided into two compartments for containing the two sets of primary and secondary transmission members and the operative connections between them, one set being located in each compartment of the casing, means for independently supporting said casing as a single unit, two driven members, two additional casings wherein the said driven members are individually carried one in each casing, means for independently supporting said last-named casings each as a single unit and one on each side of the first-mentioned casing so as each to be located adjacent to one of the said compartments therein, and a readily-disconnectible coupling interposed between each secondary transmission member and its adjacent driven member, said couplings being situated in the planes of the adjacent faces of said casings and the coupled elements being supported by the said casings in such a manner as to permit the uncoupling and detachment of either of the said driven members from the secondary transmission member without necessarily disturbing the connection between the primary and secondary transmission members.

7. In a machine the combination of a main driving shaft, a plurality of driven members spaced apart along the length of said driving shaft and each driven therefrom by a transmission train of gearing comprising in combination a primary transmission member, a clutch interposed between said primary transmission member and the main shaft to transmit motion, when desired, from the latter to the former, a secondary transmission member, means for operatively coupling said secondary transmission member to the primary transmission member to be driven thereby, a readily-disconnectible coupling interposed between said secondary transmission member and the corresponding driven member to which it is appropriated, and means for supporting said coupled elements in such a manner as to permit the uncoupling and detachment of the said driven member from the secondary transmission member without necessarily disturbing the connection between the primary and secondary transmission members.

8. A transmission train of gearing, comprising in combination a primary transmission member, a clutch interposed between said primary transmission member and a main driving shaft to transmit motion, when desired, from the latter to the former, a secondary transmission member, means for operatively coupling said secondary transmission member to the primary transmission member to be driven thereby, a casing for containing the primary and secondary transmission members and the operative connections between them, means for independently supporting said casing as a single unit, a driven member, another casing enclosing said driven member, an open topped seating for independently supporting said last-named casing as a single unit, which seating leaves the casing free to be lifted therefrom, and a readily-disconnectible coupling interposed between said secondary transmission member and the said driven member, the coupled elements being supported by the said casings in such a manner as to permit the uncoupling and detachment of the said driven member from the secondary transmission member without necessarily disturbing the connection between the primary and secondary transmission members and said readily-disconnectible coupling comprising a set of teeth rigid so far as rotation is concerned with the said secondary transmission member, other teeth rigid so far as rotation is concerned with the said driven member and arranged to mesh with the first-mentioned set of teeth, and detachable means for drawing the said sets of teeth towards each other and maintaining them in operative engagement.

9. A transmission train of gearing, comprising in combination a primary transmission member, a clutch interposed between said primary transmission member and a main driving shaft to transmit motion, when desired, from the latter to the former, a secondary transmission member, means for operatively coupling said secondary transmission member to the primary transmission member to be driven thereby, a casing for containing the primary and secondary transmission members and the operative connections between them, means for independently supporting said casing as a single unit, a driven member, another casing enclosing said driven member, an open topped seating for independently supporting said last-named casing as a single unit, which seating leaves the casing free to be lifted therefrom, and a readily disconnectible coupling interposed between said secondary transmission member and the said driven member, the coupled elements being supported by the said casings in such a manner as to permit the uncoupling and detachment of the said driven member from the secondary transmission member without necessarily disturbing the connection between the primary and secondary transmission members and said readily-disconnectible coupling comprising a set of teeth rigid so far as rotation is concerned with the said secondary transmission member, other teeth rigid so far as rotation is concerned with the said driven member and arranged to mesh with the first-mentioned set of teeth, a rod lying along the axis of the secondary transmission member and of the driven member and formed at one end with a shoulder to abut against one of said last-named parts (the secondary transmission member and the driven member), and means for adjustably attaching said rod at its other end to the other of said parts and thus drawing the said sets of teeth towards each other and maintaining them in operative engagement.

10. A transmission train of gearing, comprising in combination a primary transmission member, a clutch interposed between said primary transmission member and a main driving shaft to transmit motion, when desired, from the latter to the former, a secondary transmission member, means for operatively coupling said secondary transmission member to the primary transmission member to be driven thereby, a casing for containing the primary and secondary transmission members and the operative connections between them, means for independently supporting said casing as a single unit, a driven member, another casing enclosing said driven member, an open topped seating for independently supporting said last-named casing as a single unit, which seating leaves the casing free to be lifted therefrom, and a readily-disconnectible coupling interposed between said secondary transmission member and the said driven member, the coupled elements being supported by the said casings in such a manner as to permit the uncoupling and detachment of the said driven member from the secondary transmission member without necessarily disturbing the connection between the primary and secondary transmission member and said readily disconnectible coupling comprising a set of teeth rigid so far as rotation is concerned with the said secondary transmission member, other teeth rigid so far as rotation is concerned with the said driven member and arranged to mesh with the first-mentioned set of teeth, a rod lying along the axis of the secondary transmission member and of the driven member and having at one end a head whereof the back forms a shoulder to abut against one of said last-named parts (the secondary transmission member and the driven member) and screwthread means for attaching the other end of said rod to the other of said parts for drawing the said sets of teeth towards each other and maintaining them in operative engagement.

11. A transmission train of gearing, comprising in combination a primary transmission member, a clutch interposed between said primary transmission member and a main driving shaft to transmit motion, when desired, from the latter to the former, a secondary transmission member, means for operatively coupling said secondary transmission member to the primary transmission member to be driven thereby, a casing for containing the primary and secondary transmission members and the operative connections between them, means for independently supporting said casing as a single unit, a driven member, another casing enclosing said driven member, an open topped seating for independently supporting said last-named casing as a single unit, which seating leaves the casing free to be lifted therefrom, a readily-disconnectible coupling interposed between said secondary transmission member and the said driven member, the coupled elements being supported by the said casings in such a manner as to permit the uncoupling and detachment of the said driven member from the secondary transmission members and said readily-disconnectible coupling comprising a set of teeth rigid so far as rotation is concerned with the said secondary transmission member, other teeth rigid so far as rotation is concerned with the said driven member and aranged to mesh with the first-mentioned set of teeth, a rod lying along the axis of the secondary transmission member and of the driven member and having at one end a head whereof the back forms a shoulder to abut against one of said last-named parts (the secondary transmission member and the driven member) screw-thread means for attaching the other end of said rod to the other of said parts for drawing the said sets of teeth towards each other and maintaining them in operative engagement, and a distance piece interposed between the members carrying the said sets of teeth to limit the closeness with which the sets of teeth can be drawn together.

In testimony whereof I affix my signature.

JAMES LEVER RUSHTON.